(12) United States Patent
Keeling et al.

(10) Patent No.: US 9,876,366 B2
(45) Date of Patent: Jan. 23, 2018

(54) METHODS AND APPARATUS UTILIZING A BIPOLAR DOUBLE D VEHICLE COUPLER IN WIRELESS POWER TRANSFER APPLICATIONS

(71) Applicant: QUALCOMM Incorporated, San Diego, CA (US)

(72) Inventors: Nicholas Athol Keeling, Auckland (NZ); Mickel Bipin Budhia, Auckland (NZ); Chang-Yu Huang, Auckland (NZ)

(73) Assignee: QUALCOMM Incorporated, San Diego, CA (US)

(*) Notice: Subject to any disclaimer, the term of this patent is extended or adjusted under 35 U.S.C. 154(b) by 241 days.

(21) Appl. No.: 14/865,428

(22) Filed: Sep. 25, 2015

(65) Prior Publication Data

US 2017/0093169 A1    Mar. 30, 2017

(51) Int. Cl.
| | | |
|---|---|---|
| H01F 27/42 | (2006.01) | |
| H02J 5/00 | (2016.01) | |
| H02J 17/00 | (2006.01) | |
| H02J 7/02 | (2016.01) | |
| B60L 11/18 | (2006.01) | |

(52) U.S. Cl.
CPC .............. *H02J 5/005* (2013.01); *B60L 11/182* (2013.01); *H02J 7/025* (2013.01); *H02J 17/00* (2013.01)

(58) Field of Classification Search
CPC . H02J 5/005; H02J 7/025; H02J 17/00; B60L 11/182
USPC ................... 307/104; 320/107–115
See application file for complete search history.

(56) References Cited

U.S. PATENT DOCUMENTS

| | | | |
|---|---|---|---|
| 2007/0279002 A1* | 12/2007 | Partovi ................. | H02J 7/0027 320/115 |
| 2012/0049991 A1 | 3/2012 | Baarman et al. | |
| 2013/0285463 A1 | 10/2013 | Covic et al. | |
| 2014/0125140 A1* | 5/2014 | Widmer ................. | H02J 7/025 307/104 |
| 2014/0239729 A1 | 8/2014 | Covic | |
| 2015/0094887 A1 | 4/2015 | Kawashima | |

FOREIGN PATENT DOCUMENTS

| | | |
|---|---|---|
| EP | 2849314 A1 | 3/2015 |
| WO | WO-2014011059 A1 | 1/2014 |

OTHER PUBLICATIONS

International Search Report and Written Opinion—PCT/US2016/049213—ISA/EPO—dated Nov. 15, 2016.

* cited by examiner

*Primary Examiner* — Thomas Skibinski
(74) *Attorney, Agent, or Firm* — Knobbe, Martens, Olson & Bear, LLP

(57) ABSTRACT

Systems, methods, and apparatuses utilizing a bipolar double D vehicle coupler in wireless power transfer applications are described herein. Some implementations may include an apparatus for wireless power transfer. The apparatus comprises a first coil and a second coil connected in series to form a first circuit. The first coil does not overlap the second coil. The apparatus comprises a third coil and a fourth coil electrically connected in series to form a second circuit. The third coil does not overlap the fourth coil. At least a portion of the first circuit overlaps at least a portion of the second circuit. The first circuit is substantially magnetically decoupled from the second circuit.

30 Claims, 6 Drawing Sheets

METHODS AND APPARATUS UTILIZING A BIPOLAR DOUBLE D VEHICLE COUPLER IN WIRELESS POWER TRANSFER APPLICATIONS

FIELD

The described technology generally relates to wireless power. More specifically, the disclosure is directed to methods and apparatus utilizing a bipolar double D vehicle coupler in wireless power transfer applications.

BACKGROUND

Inductive power transfer (IPT) systems are designed to wirelessly transfer charging power from a base pad to a vehicle pad. Such wireless power transfer is most efficient when the base pad and the vehicle pad are properly aligned with each other. However, depending upon the type of IPT system, certain alignments between the base pad and the vehicle pad experience nulls in the magnetic field strength and amount of power that is wirelessly transferrable. Thus, methods and apparatus utilizing a bipolar double D vehicle coupler in wireless power transfer applications may be desirable.

SUMMARY

An apparatus for wireless power transfer is provided. The apparatus comprises a first coil and a second coil connected in series to form a first circuit. The first coil does not overlap the second coil. The apparatus comprises a third coil and a fourth coil connected in series to form a second circuit. The third coil does not overlap the fourth coil. At least a portion of the first circuit overlaps at least a portion of the second circuit. The first circuit is substantially magnetically decoupled from the second circuit.

A method of wireless power transfer is provided. The method comprises receiving wireless power via a first circuit under the influence of an alternating magnetic field. The first circuit comprises a first coil connected in series with a second coil. The first coil does not overlap the second coil. The method further comprises receiving wireless power via a second circuit under the influence of the alternating magnetic field. The second circuit comprising a third coil connected in series with a fourth coil. The third coil does not overlap the fourth coil. At least a portion of the first circuit overlaps at least a portion of the second circuit. The first circuit is substantially magnetically decoupled from the second circuit.

An apparatus for wireless power transfer is provided. The apparatus comprises first means for receiving wireless power under the influence of an alternating magnetic field. The apparatus further comprises second means for receiving wireless power under the influence of the alternating magnetic field connected in series with the first means to form a first circuit. The first means does not overlap the second means. The apparatus further comprises third means for receiving wireless power under the influence of the alternating magnetic field. The apparatus further comprises fourth means for receiving wireless power under the influence of the alternating magnetic field connected in series with the third means to form a second circuit. The third means does not overlap the fourth means. At least a portion of the first circuit overlaps at least a portion of the second circuit. The first circuit is substantially magnetically decoupled from the second circuit.

Figure 1:
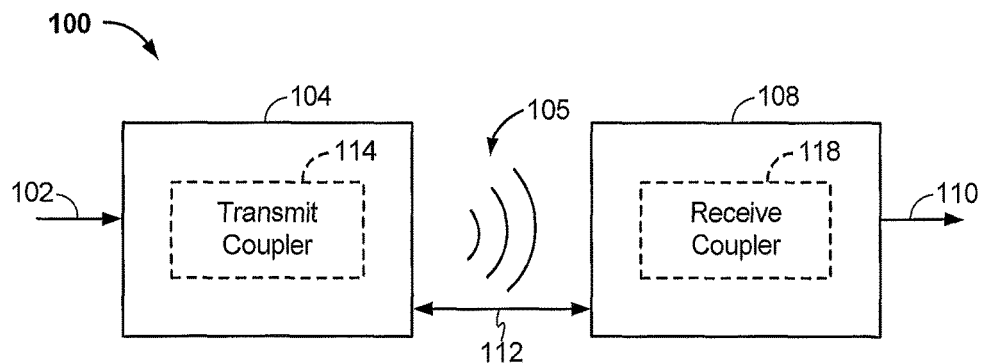
FIG. 1 is a functional block diagram of a wireless power transfer system, in accordance with some implementations.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with some exemplary implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In one example implementation, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
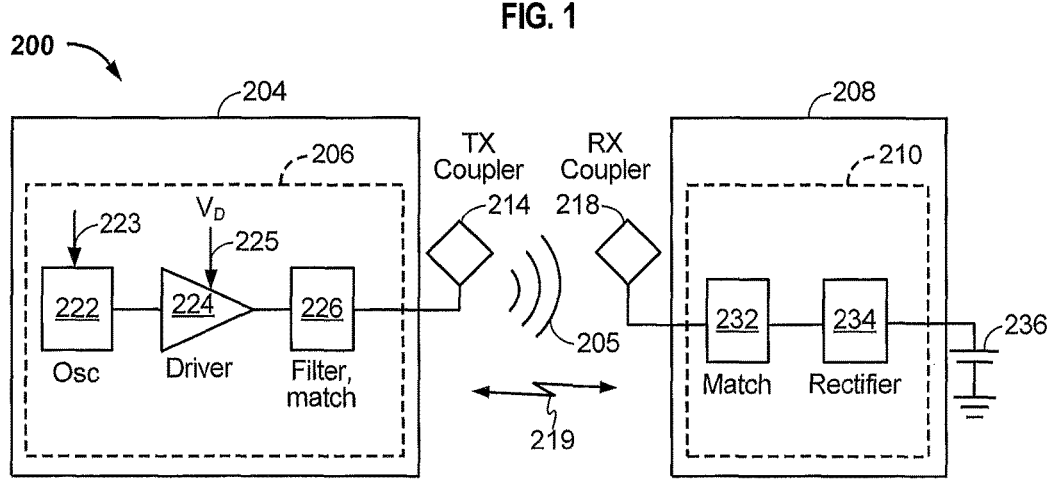
FIG. 2 is a functional block diagram of a wireless power transfer system, in accordance with some implementations.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
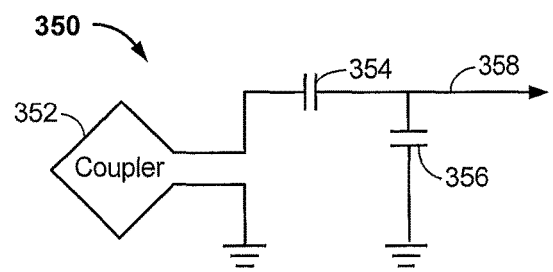
FIG. 3 is a schematic diagram of a portion of transmit circuitry or receive circuitry of FIG. 2 including a transmit or receive antenna, in accordance with some implementations.

FIG. 3 is a schematic diagram of a portion of the transmit circuitry 206 or the receive circuitry 210 of FIG. 2, in accordance with some exemplary implementations. As illustrated in FIG. 3, transmit or receive circuitry 350 may include a coupler 352. The coupler 352 may also be referred to or be configured as a "conductor loop", a coil, an inductor, or a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, with a frequency that substantially corresponds to the resonant frequency of the coupler 352, may be an input to the coupler 352.

Figure 4:
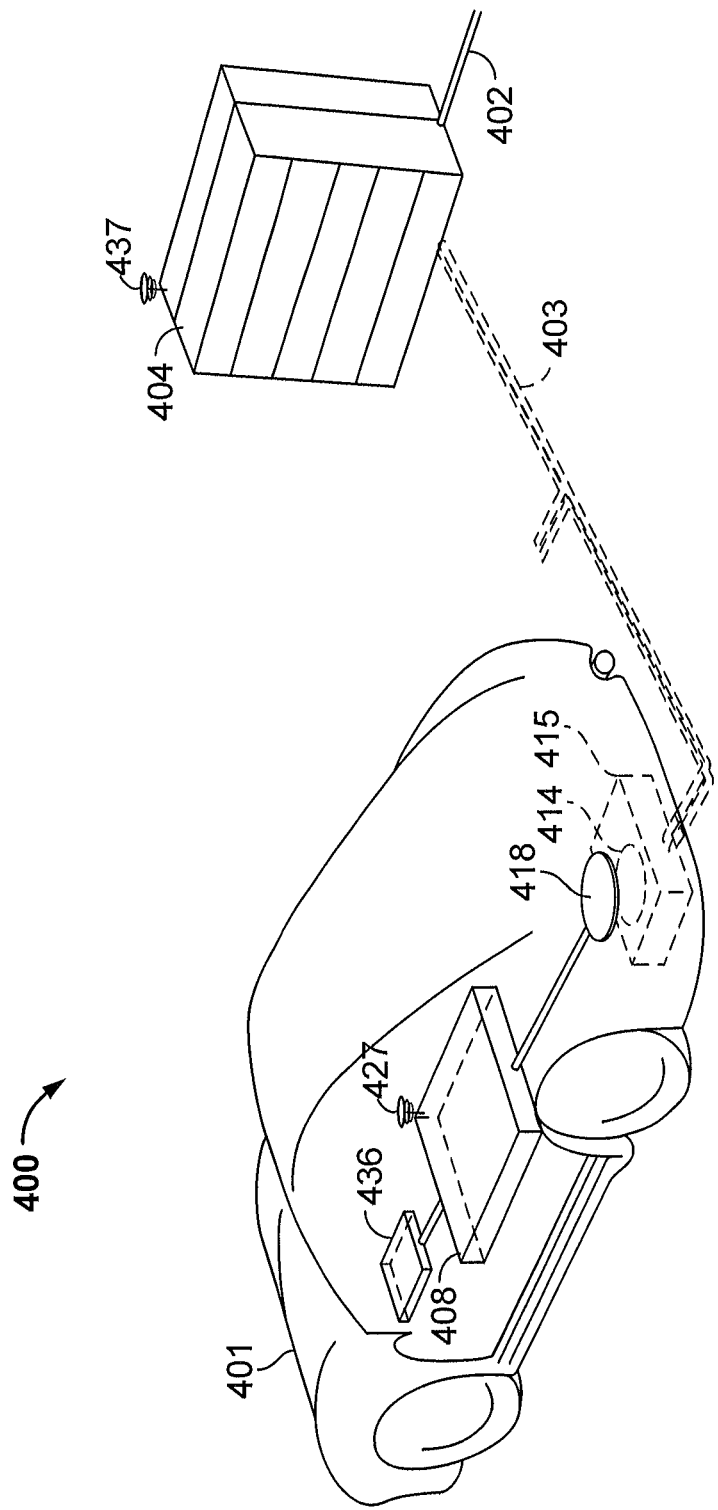
FIG. 4 is a diagram of an electrically chargeable vehicle aligned over a wireless power transmitter coil, in accordance with some implementations.

FIG. 4 is a diagram of an electrically chargeable vehicle aligned over a wireless power transmitter coil, in accordance with some implementations. The wireless power transfer system 400 enables charging of the vehicle 401 while the vehicle 401 is parked near the transmitter 404. Space is shown for the vehicle 401 to be parked over the transmit coil 414. The transmit coil 414 may be located within a base pad 415. In some implementations, the transmitter 404 may be connected to a power backbone 402. The transmitter 404 may be configured to provide an alternating current (AC), through an electrical connection 403, to the transmit coil 414 located within the base pad 415. The vehicle 401 may include a battery 436, a receive coil 418, and an antenna 427 each connected to the receiver 408.

In some implementations, the receive coil 418 may receive power when the receive coil 418 is located in a wireless (e.g., magnetic or electromagnetic) field produced by the transmit coil 414. The wireless field corresponds to a region where energy output by the transmit coil 414 may be captured by the receive coil 418. In some cases, the wireless field may correspond to the "near field" of the transmit coil 414.

It is desirable that the receive coil 418 provides at least some minimum rated power to the receiver 404 in order to efficiently charge the battery 436 or power the vehicle 401. The minimum rated power may include additional electrical load requirements in addition to charging the battery 436, for example, any electrical requirements of one or more electronic devices within and powered by the vehicle 401.

Figure 5:
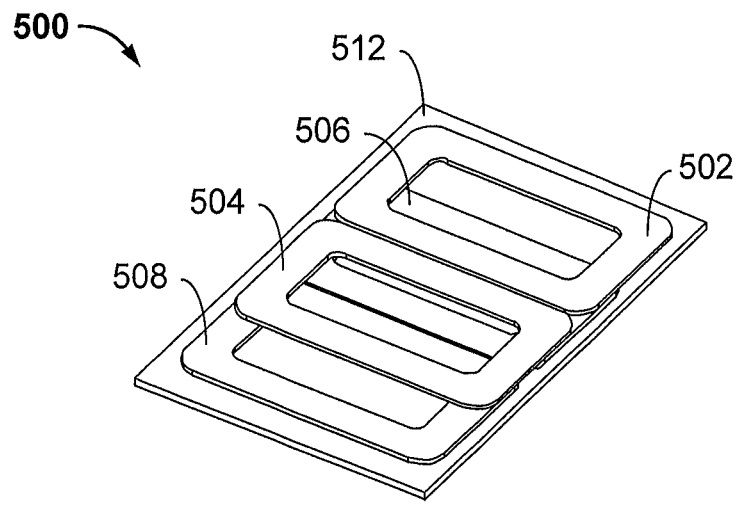
FIG. 5 is an isometric illustration of a bipolar double D vehicle coupler for a wireless power transfer system, in accordance with some implementations.

FIG. 5 is an isometric illustration of a bipolar double D vehicle coupler 500 for a wireless power transfer system, in accordance with some implementations. Although FIG. 5 is shown for use in a vehicle coupler, the present application also contemplates utilized the same or a similar implementation for wireless power transmission by the base coupler on the wireless power transmission side. The coupler 500 comprises a first coil 502 disposed adjacent to a second coil 504. The first and second coils 502, 504 do not overlap one another. The first and second coils 502, 504 are connected in series with one another and/or are wound from the same conductor to form a first circuit comprising one of a plurality of "double D" coils. The coupler 500 further comprises a third coil 506 disposed adjacent to a fourth coil 508. The third and fourth coils 506, 508 do not overlap one another. The third and fourth coils 506, 508 are connected in series with one another and/or are wound from the same conductor to form a second circuit comprising a second of the plurality of "double D" coils. At least a portion of at least one of the first and second coils 502, 504 overlaps at least one of the third and fourth coils 506, 508. In this way, the first and second double D coils (e.g., the first and second circuits) comprising the first and second coils 502, 504 and the third and fourth coils 506, 508, respectively, form a bipolar arrangement. In some implementations, each of the first through fourth coils 502, 504, 506, 508 are disposed on a ferrite structure 512, which may be utilized to channel magnetic flux in desired directions and through desired paths for more efficient wireless power transfer. In some implementations where the coupler 500 transmits rather than receives wireless power, the first "double D" coil may be driven independently of the second "double D" coil. As will be described in more detail in connection with FIGS. 7-10, the utilization of the first through fourth coils 502, 504, 506, 508 to form the bipolar double D coupler 500 eliminates any nulls in the magnetic field strength and, consequently in the rate and efficiency of power transfer, that plague conventional double D coil arrangements. In some implementations, each of the first through the fourth coils 502, 504, 506, 508 have substantially the same dimensions. However, the present application is not so limited. Moreover, the first circuit (e.g., the first and second coils 502, 504) is substantially magnetically decoupled from the second circuit (e.g., the third and fourth coils 506, 508). Here, "substantially magnetically decoupled" means that any magnetic flux that passes through one or both cross sections defined by the turns of the first and second coils 502, 504, respectively, and that also passes through one or both cross sections defined by the turns of the third and fourth coils 506, 508, respectively, induces equal but opposite voltages in the first and second circuits.

Figure 6:
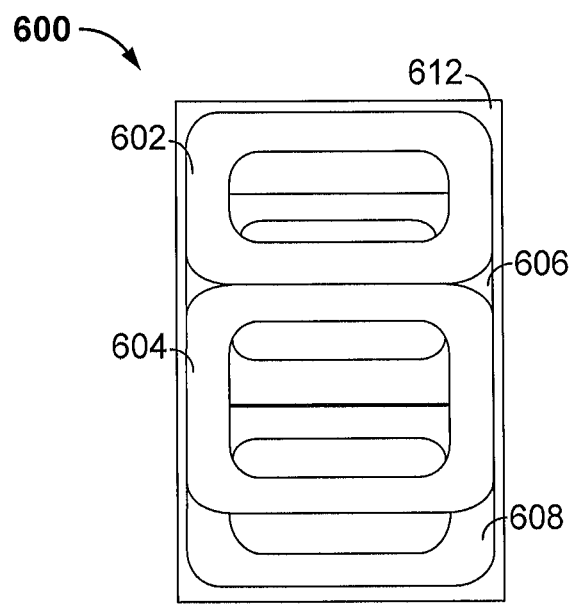
FIG. 6 is an overhead illustration of a bipolar double D vehicle coupler for a wireless power transfer system, in accordance with some implementations.

FIG. 6 is an overhead illustration of a bipolar double D vehicle coupler 600 for a wireless power transfer system, in accordance with some implementations. The coupler 600 comprises a first coil 602 disposed adjacent to a second coil 604 and form one of a plurality of "double D" coils. The first and second coils 602, 604 may be connected in series with each other and/or may be wound from the same conductor. The first and second coils 602, 604 do not overlap. The coupler 600 further comprises a third coil 606 disposed adjacent to a fourth coil 608 to form a second of a plurality of "double D" coils. The third and fourth coils 606, 608 may be connected in series with each other and/or wound from the same conductor. At least a portion of at least one of the first and second coils 602, 604 overlaps at least one of the third and fourth coils 606, 608. In this way, the first and second double D coils (e.g., the first and second circuits), comprising the first and second coils 602, 604 and the third and fourth coils 606, 608, respectively, form a bipolar arrangement. In some implementations, each of the first through fourth coils 602, 604, 606, 608 are disposed on a ferrite structure 612, which may be utilized to channel magnetic flux in desired directions and through desired paths for more efficient wireless power transfer. As will be described in more detail in connection with FIGS. 7-10, the utilization of the first through fourth coils 602, 604, 606, 608 to form the bipolar double D coupler 600 eliminates any nulls in the magnetic field strength and, consequently in the rate and efficiency of power transfer, that plague conventional double D coils. As shown in FIG. 6, the first through the fourth coils 602, 604, 606, 608 do not have the same dimensions as one another, e.g., they are asymmetrically dimensioned. For example, the first coil 602 and the fourth coil 608 may have the same dimensions as one another, while the second coil 604 and the third coil 606 may have the same dimensions as one another. However, this is only one example implementation and any of the first through fourth coils 602, 604, 606, 608 may have the same or different dimensions as compared to any other of the first through fourth coils 602, 604, 606, 608. The definition of "substantially mutually decoupled" described in connection with FIG. 5 also holds for FIG. 6.

Figure 7:
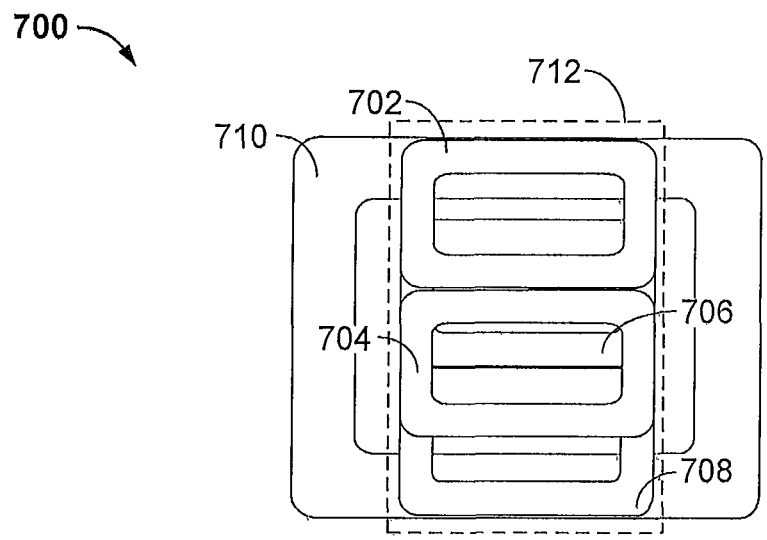
FIG. 7 is an overhead illustration of a bipolar double D vehicle coupler disposed over a base pad coupler, in accordance with some implementations.

FIG. 7 is an overhead illustration of a bipolar double D vehicle coupler 700 disposed over a base pad coupler 710. The organization of the first coil 702, the second coil 704, the third coil 706 and the fourth coil 708 may be substantially the same as previously described for the first through fourth coils 502/602, 504/604, 506/606, 508/608 of either of FIGS. 5/6, respectively. For example, the first through fourth coils 702, 704, 706, 708 may have the same dimensions or different dimensions from one another. In some implementations, each of the first through fourth coils 702, 704, 706, 708 are disposed on a ferrite structure 712, which may be utilized to channel magnetic flux in desired directions and through desired paths for more efficient wireless power transfer. Although not limiting, FIG. 7 illustrates the base pad coupler 710 as having dimensions at least as large as the respective dimensions of the bipolar double D vehicle coupler 700 formed from the first through fourth coils 702, 704, 706, 708. Thus, overall combined dimensions of the first, second, third and fourth coils 702, 704, 706, 708 (e.g., the total length or width of the coupler 700 formed when the first through fourth coils 702, 704, 706, 708 are disposed as shown in FIG. 7) are substantially the same as respective dimensions of the base pad coil 710. The definition of "substantially mutually decoupled" described in connection with FIG. 5 also holds for FIG. 7.

Figure 8:
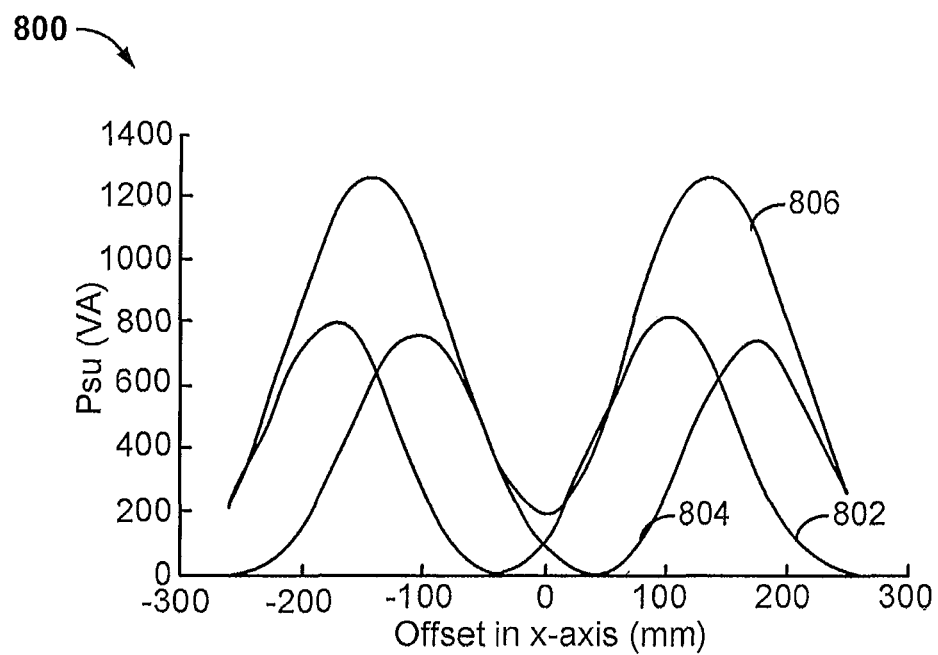
FIG. 8 is a graph illustrating an amount of power wirelessly transmitted from the base pad coupler to the bipolar double D vehicle coupler of FIG. 7, in accordance with some implementations.

FIG. 8 is a graph 800 illustrating an amount of power wirelessly transmitted from the base pad coupler 710 to the bipolar double D vehicle coupler 700 of FIG. 7, in accordance with some implementations. A first trace 802 indicates an exemplary amount of power (in volt-amps—VA) wirelessly received by the double D coil (e.g., a first circuit) comprising the first and second coils 702, 704 for a range of offsets between the center of the base pad coupler 710 and the center of the entire bipolar double D coupler 700. As shown, there is a null in the power wirelessly received by the first circuit (e.g., the first and second coils 702, 704) at approximately a −40 mm offset, which corresponds to a position where the border between the first and second coils 702, 704 would be directly over the center of the base pad coupler 710. The first trace 802 additionally includes two peaks at lateral offsets of approximately −180 mm and 140 mm, one where the center of the first coil 702 would be centered over the base pad coupler 710 and one where the center of the second coil 704 would be centered over the base pad coupler 710.

A second trace 804 indicates an exemplary amount of power (in volt-amps—VA) received by the double D coil (e.g., the second circuit) comprising the third and fourth coils 706, 708 for a range of offsets between the center of the base pad coupler 710 and the center of the entire bipolar double D coupler 700. As shown, there is a null in the power received by the second circuit (e.g., the third and fourth coils 706, 708) at approximately an 40 mm offset, which corresponds to a position where the border between the third and fourth coils 706, 708 would be directly over the center of the base pad coupler 710. The second trace 804 additionally includes two peaks at lateral offsets of approximately 140 mm and 180 mm, one where the center of the third coil 706 would be centered over the base pad coupler 710, and one where the center of the fourth coil 708 would be centered over the base pad coupler 710.

A third trace 806 indicates an exemplary amount of combined power (in volt-amps—VA) received by both double D coils (e.g., the first and second circuits) of the first and second traces 802, 804. As can be seen, there is no null in the power received, though there is a dip of approximately 200 VA at a substantially center alignment (e.g., 0 mm lateral offset), and two peaks of approximately 1200 VA disposed at substantially the same offsets at which the received power of each of the first and second traces 802, 804 cross one another (e.g., at approximately ±160 mm). Thus, the utilization of the bipolar double D coupler 700 design eliminates the nulls associated with purely double D coupler arrangements.

Figure 9:
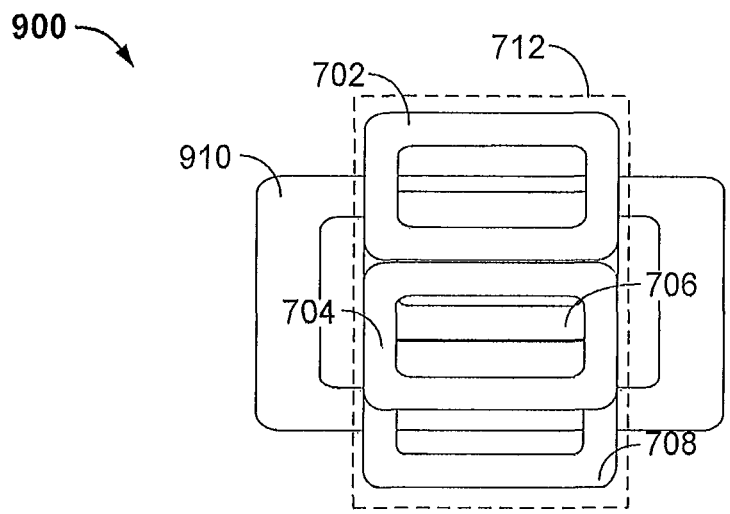
FIG. 9 is an overhead illustration of the bipolar double D vehicle coupler of FIG. 7 disposed over another base pad coupler, in accordance with some implementations.

FIG. 9 is an overhead illustration of the bipolar double D vehicle coupler 700 of FIG. 7 disposed over another base pad coupler 910, in accordance with some implementations. The organization of the first coil 702, the second coil 704, the third coil 706 and the fourth coil 708 are as previously described in connection with FIG. 7. In some implementations, each of the first through fourth coils 702, 704, 706, 708 are disposed on a ferrite structure 712, which may be utilized to channel magnetic flux in desired directions and through desired paths for more efficient wireless power transfer. The base pad coupler 910 has at least one dimension smaller than a respective dimension of the bipolar double D vehicle coupler 900 formed from the first through fourth coils 702, 704, 706, 708. Thus, the base pad coupler 910 may be shorter in at least one dimension compared to the base pad coupler 710 of FIG. 7. In other words, the overall combined dimensions of the first, second, third and fourth coils 702, 704, 706, 708 are larger than respective dimensions of the base pad coil 910.

Figure 10:
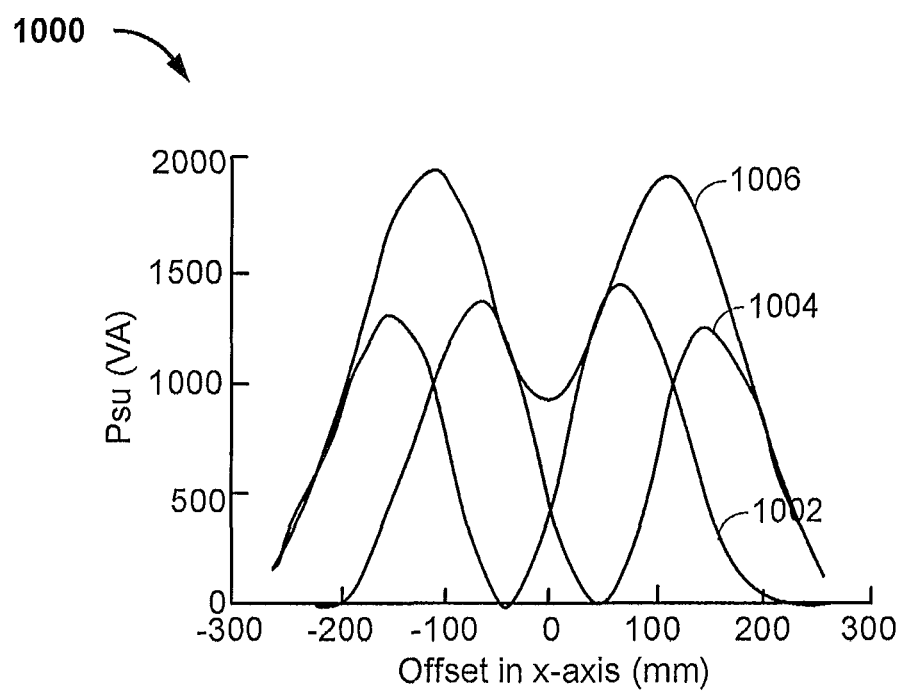
FIG. 10 is a graph illustrating an amount of power wirelessly transmitted from the base pad coupler to the bipolar double D vehicle coupler of FIG. 9, in accordance with some implementations.

FIG. 10 is a graph 1000 illustrating an amount of power wirelessly transmitted from the base pad coupler 910 to the bipolar double D vehicle coupler 700 of FIG. 7, in accordance with some implementations. A first trace 1002 indicates an exemplary amount of power (in volt-amps—VA) received by the double D coil (e.g., a first circuit) comprising the first and second coils 702, 704 for a range of offsets between the center of the base pad coupler 910 and the center of the entire bipolar double D coupler 700. As shown, there is a null in the power received by the first circuit (e.g., the first and second coils 702, 704) at approximately a 40 mm offset, which corresponds to a position where the border between the first and second coils 702, 704 would be directly over the center of the base pad coupler 910. The first trace 1002 additionally includes two peaks at lateral offsets of approximately −160 mm and 60 mm, one where the center of the first coil 702 would be centered over the base pad coupler 910 and one where the center of the second coil 704 would be centered over the base pad coupler 910.

A second trace 1004 indicates an exemplary amount of power (in volt-amps—VA) received by the double D coil (e.g., the second circuit) comprising the third and fourth coils 706, 708 for a range of offsets between the center of the base pad coupler 910 and the center of the entire bipolar double D coupler 700. As shown, there is a null in the power received by the second circuit (e.g., the third and fourth coils 706, 708) at approximately a 40 mm offset, which corresponds to a position where the border between the third and fourth coils 706, 708 would be directly over the center of the base pad coupler 910. The second trace 1004 additionally includes two peaks at lateral offsets of approximately −60 mm and 160 mm, one where the center of the third coil 706 would be centered over the base pad coupler 910, and one where the center of the fourth coil 708 would be centered over the base pad coupler 910.

A third trace 1006 indicates an exemplary amount of combined power (in volt-amps—VA) received by both double D coils (e.g., the first and second circuits) of the first and second traces 1002, 1004. As can be seen, there is no null in the power received, though there is a dip of approximately 1000 VA at a substantially center alignment (e.g., 0 mm lateral offset), and two peaks of approximately 2000 VA disposed at substantially the same offsets at which the received power of each of the first and second traces 1002, 1004 cross one another (e.g., at approximately ±110 mm). Thus, the utilization of the bipolar double D coupler 900 design eliminates the nulls associated with purely double D coupler arrangements.

Figure 11:
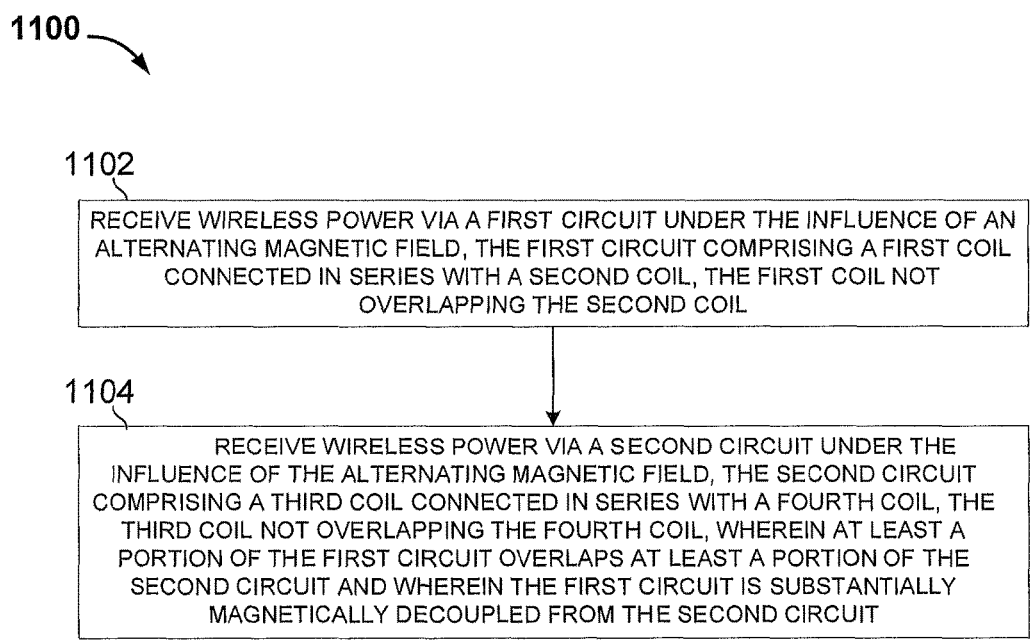
FIG. 11 illustrates a flowchart of a method for wireless power transfer, in accordance with some implementations.

FIG. 11 illustrates a flowchart 1100 of a method for wireless power transfer, in accordance with some implementations. The method of flowchart 1100 is described herein with reference to at least FIGS. 1-10. Although the method of flowchart 1100 is described herein with reference to a particular order, in various embodiments, blocks herein may be performed in a different order, or omitted, and additional blocks may be added. In some implementations, the flowchart 1100 may apply when a vehicle (e.g., the vehicle 401 of FIG. 4) is positioned for wireless power transfer from a wireless power transmitter.

The method may begin at block 1102, which includes receiving wireless power via a first circuit under the influence of an alternating magnetic field, the first circuit comprising a first coil connected in series with a second coil, the first coil not overlapping the second coil. For example, wireless power may be received via a first circuit under the influence of an alternating magnetic field (e.g., the wireless field 205 of FIG. 2). The first circuit comprises a first coil (e.g., coil 502/602/702) connected in series with a second coil (e.g., coil 504/604/704). The first coil (e.g., coil 502/602/702) is disposed adjacent to and not overlapping the second coil (e.g., coil 504/604/704). The flowchart 1100 may advance to block 1104.

Block 1104 includes receiving wireless power via a second circuit under the influence of the alternating magnetic field, the second circuit comprising a third coil connected in series with a fourth coil, the third coil not overlapping the fourth coil, wherein at least a portion of the first circuit overlaps at least a portion of the second circuit and wherein the first circuit is substantially magnetically decoupled from the second circuit. For example, wireless power may be received via a second circuit under the influence of the alternating magnetic field (e.g., the wireless field 205 of FIG. 2). The second circuit comprises a third coil (e.g., coil 506/606/706) connected in series with a fourth coil (e.g., coil 508/608/708). The third coil (e.g., coil 506/606/706) is disposed adjacent to and not overlapping the fourth coil (e.g., coil 508/608/708). At least a portion of the first circuit overlaps at least a portion of the second circuit. The first circuit is substantially magnetically decoupled from the second circuit.

The various operations of methods described above may be performed by any suitable means capable of performing the operations, such as various hardware and/or software component(s), circuits, and/or module(s). Generally, any operations illustrated in the FIGs. may be performed by corresponding functional means capable of performing the operations. For example, any of the coils 502/602/702 may comprise first means for receiving wireless power under the influence of an alternating magnetic field. Likewise, any of the coils 506/606/706 may comprise second means for receiving wireless power under the influence of the alternating magnetic field. Similarly, any of the coils 506/606/706 may comprise third means for receiving wireless power under the influence of the alternating magnetic field. And, any of the coils 508/608/708 may comprise fourth means for receiving wireless power under the influence of the alternating magnetic field. The ferrite structure 512/612/712 may comprise means for channeling magnetic flux.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular implementation. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present invention is not intended to be limited to the implementations shown herein but is to be accorded the widest scope consistent with the principles and novel features disclosed herein.

What is claimed is:

1. An apparatus for wireless power transfer, the apparatus comprising:
    a first coil and a second coil connected in series to form a first circuit, the first coil not overlapping the second coil;
    a third coil and a fourth coil connected in series to form a second circuit, the third coil not overlapping the fourth coil,
    wherein at least a portion of the first circuit overlaps at least a portion of the second circuit and wherein the first circuit is substantially magnetically decoupled from the second circuit.

2. The apparatus of claim 1, wherein the first coil has different dimensions from the second coil and the third coil has different dimensions from the fourth coil.

3. The apparatus of claim 1, wherein the first coil has the same dimensions as the second coil and the third coil has the same dimensions as the fourth coil.

4. The apparatus of claim 1, further comprising a ferrite structure, wherein each of the first, second, third and fourth coils are disposed over the ferrite structure.

5. The apparatus of claim 4, wherein the first circuit and the second circuit are configured to be driven independently.

6. The apparatus of claim 1, wherein the apparatus comprises a wireless power transmitter.

7. The apparatus of claim 1, wherein the apparatus comprises a wireless power receiver.

8. The apparatus of claim 1, wherein overall combined dimensions of the first, second, third and fourth coils are substantially the same as respective dimensions of a base pad coil of a transmitter configured to wirelessly transmit power to the apparatus.

9. The apparatus of claim 1, wherein overall combined dimensions of the first, second, third and fourth coils are larger than respective dimensions of a base pad coil of a transmitter configured to wirelessly transmit power to the apparatus.

10. The apparatus of claim 1, wherein the first and second coils comprise a first conductor and the third and fourth coils comprise a second conductor.

11. A method for wireless power transfer, the method comprising:
    receiving wireless power via a first circuit under the influence of an alternating magnetic field, the first circuit comprising a first coil connected in series with a second coil, the first coil not overlapping the second coil, and
    receiving wireless power via a second circuit under the influence of the alternating magnetic field, the second circuit comprising a third coil connected in series with a fourth coil, the third coil not overlapping the fourth coil,
    wherein at least a portion of the first circuit overlaps at least a portion of the second circuit and wherein the first circuit is substantially magnetically decoupled from the second circuit.

12. The method of claim 11, wherein the first coil has different dimensions from the second coil and the third coil has different dimensions from the fourth coil.

13. The method of claim 11, wherein the first coil has the same dimensions as the second coil and the third coil has the same dimensions as the fourth coil.

14. The method of claim 11, wherein each of the first, second, third and fourth coils are disposed over a ferrite structure.

15. The method of claim 14, wherein magnetic flux from the alternating magnetic field that passes through the overlapping portions of the first and second circuits induces currents in the first and second circuits having opposite polarity from each other.

16. The method of claim 11, wherein overall combined dimensions of the first, second, third and fourth coils are substantially the same as respective dimensions of a base pad coil that generates the alternating magnetic field.

17. The method of claim 11, wherein overall combined dimensions of the first, second, third and fourth coils are larger than respective dimensions of a base pad coil that generates the alternating magnetic field.

18. The method of claim 11, wherein the first and second coils comprise a first conductor and the third and fourth coils comprise a second conductor.

19. An apparatus for wireless power transfer, the apparatus comprising:
    first means for receiving wireless power under the influence of an alternating magnetic field;
    second means for receiving wireless power under the influence of the alternating magnetic field connected in series with the first means to form a first circuit, the first means not overlapping the second means;
    third means for receiving wireless power under the influence of the alternating magnetic field; and
    fourth means for receiving wireless power under the influence of the alternating magnetic field connected in series with the third means to form a second circuit, the third means not overlapping the fourth means,
    wherein at least a portion of the first circuit overlaps at least a portion of the second circuit and wherein the first circuit is substantially magnetically decoupled from the second circuit.

20. The apparatus of claim 19, wherein the first means has different dimensions from the second means and the third means has different dimensions from the fourth means.

21. The apparatus of claim 19, wherein the first means has the same dimensions as the second means and the third means has the same dimensions as the fourth means.

22. The apparatus of claim 19, further comprising means for channeling magnetic flux, wherein each of the first, second, third and fourth means are disposed over the means for channeling magnetic flux.

23. The apparatus of claim 19, wherein the apparatus comprises a wireless power transmitter.

24. The apparatus of claim 23, wherein the first circuit and the second circuit are configured to be driven independently.

25. The apparatus of claim 19, wherein the apparatus comprises a wireless power receiver.

26. The apparatus of claim 19, wherein overall combined dimensions of the first, second, third and fourth means are substantially the same as respective dimensions of a base pad coil of a transmitter configured to wirelessly transmit power to the apparatus.

27. The apparatus of claim 19, wherein overall combined dimensions of the first, second, third and fourth means are larger than respective dimensions of a base pad coil of a transmitter configured to wirelessly transmit power to the apparatus.

28. The apparatus of claim 19, wherein the first means comprises a first coil, the second means comprises a second coil, the third means comprises a third coil, and the fourth means comprises a fourth coil.

29. The apparatus of claim 19, wherein the means for channeling magnetic flux comprises a ferrite structure.

30. The apparatus of claim 19, wherein the first and second means comprise a first conductor and the third and fourth means comprise a second conductor.

* * * * *